United States Patent
Carey et al.

(10) Patent No.: US 6,783,079 B2
(45) Date of Patent: Aug. 31, 2004

(54) THERMOSTAT WITH ONE BUTTON PROGRAMMING FEATURE

(75) Inventors: Steven L. Carey, Imperial, MO (US); Thomas J. Fredricks, Wildwood, MO (US); Earle L. Weaver, St. Louis, MO (US)

(73) Assignee: Emerson Electric Co.

( * ) Notice: Subject to any disclaimer, the term of this patent is extended or adjusted under 35 U.S.C. 154(b) by 23 days.

(21) Appl. No.: 10/248,778

(22) Filed: Feb. 18, 2003

(65) Prior Publication Data

US 2003/0121652 A1 Jul. 3, 2003

(51) Int. Cl.[7] .............................. F23N 5/20; F24F 11/00
(52) U.S. Cl. ................................... 236/46 R; 165/238
(58) Field of Search ................................. 236/46 R, 47; 165/238; 368/10

(56) References Cited

U.S. PATENT DOCUMENTS

| | | | | |
|---|---|---|---|---|
| 4,751,961 A | * | 6/1988 | Levine et al. | 236/47 X |
| 5,363,904 A | * | 11/1994 | Pierret et al. | 236/46 R X |
| 5,561,461 A | * | 10/1996 | Landis et al. | 348/725 |
| 5,782,296 A | * | 7/1998 | Mehta | 165/268 |
| 6,577,231 B2 | * | 6/2003 | Litwin, Jr. et al. | 340/310.01 |

* cited by examiner

Primary Examiner—William Wayner
(74) Attorney, Agent, or Firm—Kevin Pumm

(57) ABSTRACT

A digital programmable thermostat comprising up and down temperature adjustment buttons, an LCD display, and a Program button, which a user can simply press once to initiate a single setback program that sets back the last user selected temperature setting during a predetermined setback time period. The thermostat can also automatically set the current time and date, to allow the user to initiate the program without having to set the current time and date.

11 Claims, 3 Drawing Sheets

THERMOSTAT WITH ONE BUTTON PROGRAMMING FEATURE

BACKGROUND OF INVENTION

There presently exist numerous programmable thermostats that will allow a user to set back the temperature set point during select periods to provide energy savings. However, programming such a thermostat typically requires the user to complete a complex series of steps to select the temperatures and time periods before the user can initiate the set back program, or force the user to use a default program that does not ideally meet the users schedule. As a result, such thermostat programs aren't utilized by many consumers. This problem of programming a thermostat is described in U.S. Pat. No. 5,782,296 to Mehta. Mehta describes a need for a user-friendly thermostat that operates as a manual thermostat at power-up, enabling the user to manually select a desired temperature immediately without having to spend time and effort programming the thermostat. It also describes a need for a thermostat that enables users to more easily customize or "program" their thermostats, as compared to existing "pre-programmed" thermostats. The thermostat in Mehta provides the user with an "Auto Prog" button that the user can press repeatedly to select from one of several arbitrary pre-programmed sets of times and temperatures, of which may not be based on any supporting consumer data. This requires the user to scroll through the pre-programmed sets to find one with a temperature setting and schedule that are satisfactory to the user. Mehta does not, as such, address the need of many users who do not want to program a thermostat, but rather want to press a single button one time to run a single energy-saving set-back program that includes the user's desired temperature setting. Thus, there is still a need for a thermostat that can be easily programmed to set back the user's desired temperature setting for a predetermined time period, by simply pressing a single button once.

SUMMARY OF INVENTION

There is provided, in accordance with one aspect of the invention, a digital thermostat comprising up and down temperature adjustment buttons, an LCD display, and a button for automatically initiating a single set back program including the last "desired" temperature selected by the user of the thermostat. The digital thermostat allows the user to adjust the temperature set point to a desirable setting using the up and down temperature buttons, and to press a program button once at any time to initiate a single program that sets back the user's desired temperature setting by a predetermined amount during setback time periods. In the preferred embodiment, the setback time period is predetermined to simplify user programming, and is based on the "go to bed" and "get up times" of U.S. Households published by the National Sleep Foundation.

It is thus an object of the invention to provide a thermostat that can easily be programmed by pressing a single button once, for initiating a single program that sets back the last selected temperature setting by a predetermined amount during predetermined setback time periods. In another embodiment of the invention, the thermostat simplifies programming by setting the time for the user.

It is a further object of the invention to provide a thermostat that can automatically set the current time and date, to allow a user to easily initiate a single set back program without having to set the current time and date. The thermostat automatically sets the current time and date using information broadcasted by station WWVB, which is operated by the National Institute of Standards and Technology. The thermostat displays the local time on an LCD.

DETAILED DESCRIPTION

Figure 1:
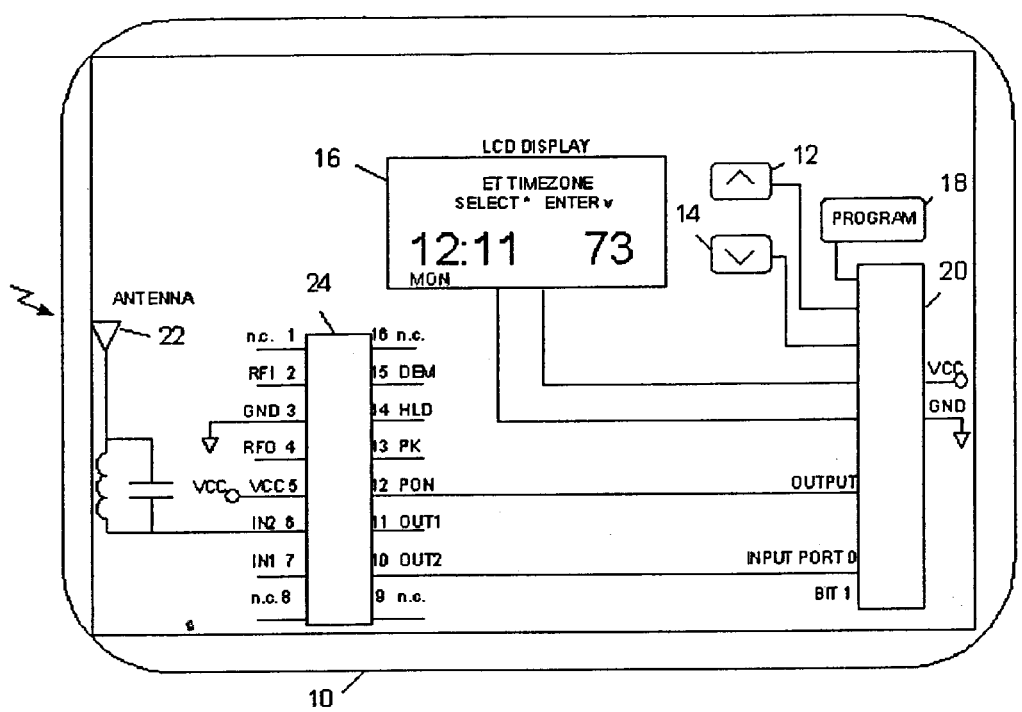
FIG. 1 is a schematic representation of the programmable digital thermostat in accordance with the present invention.

A digital thermostat incorporating the one-button programming feature according to the principles of the present invention is indicated generally at 10 in FIG. 1. The digital thermostat 10 comprises up and down temperature adjustment buttons 12 and 14, an LCD display 16, a "Program" button 18 for initiating a single temperature-setback program, a microprocessor 20, an antenna 22 and a receiver integrated circuit 24. It should be understood that the "Program" button need not be a single button, and alternatively may comprise two buttons pressed simultaneously to substantially achieve the same result of initiating a set-back program with a single action from the user. The LCD display is configured to display at a minimum the sensed temperature, the set point temperature, the time zone and the date and time. The antenna 22 is tuned to receive a 60 kHz time code signal broadcast from station WWVB in Fort Collins, and in the present invention is preferably a 60 kHz LC tuned ferrite core antenna made by HKW Elektronik GmbH. The receiver integrated circuit 24 detects and amplifies the time code signal, and is preferably an Atmel T4227 time code receiver chip, but may be any other suitable time code receiver chip. The microprocessor 20 includes a digital input port pin, for decoding the time signal from the receiver 24. The microprocessor 20 in the present invention is preferably a 32 Kb microprocessor S3C8249XZZ-OWR9 manufactured by Samsung.

Figure 2:
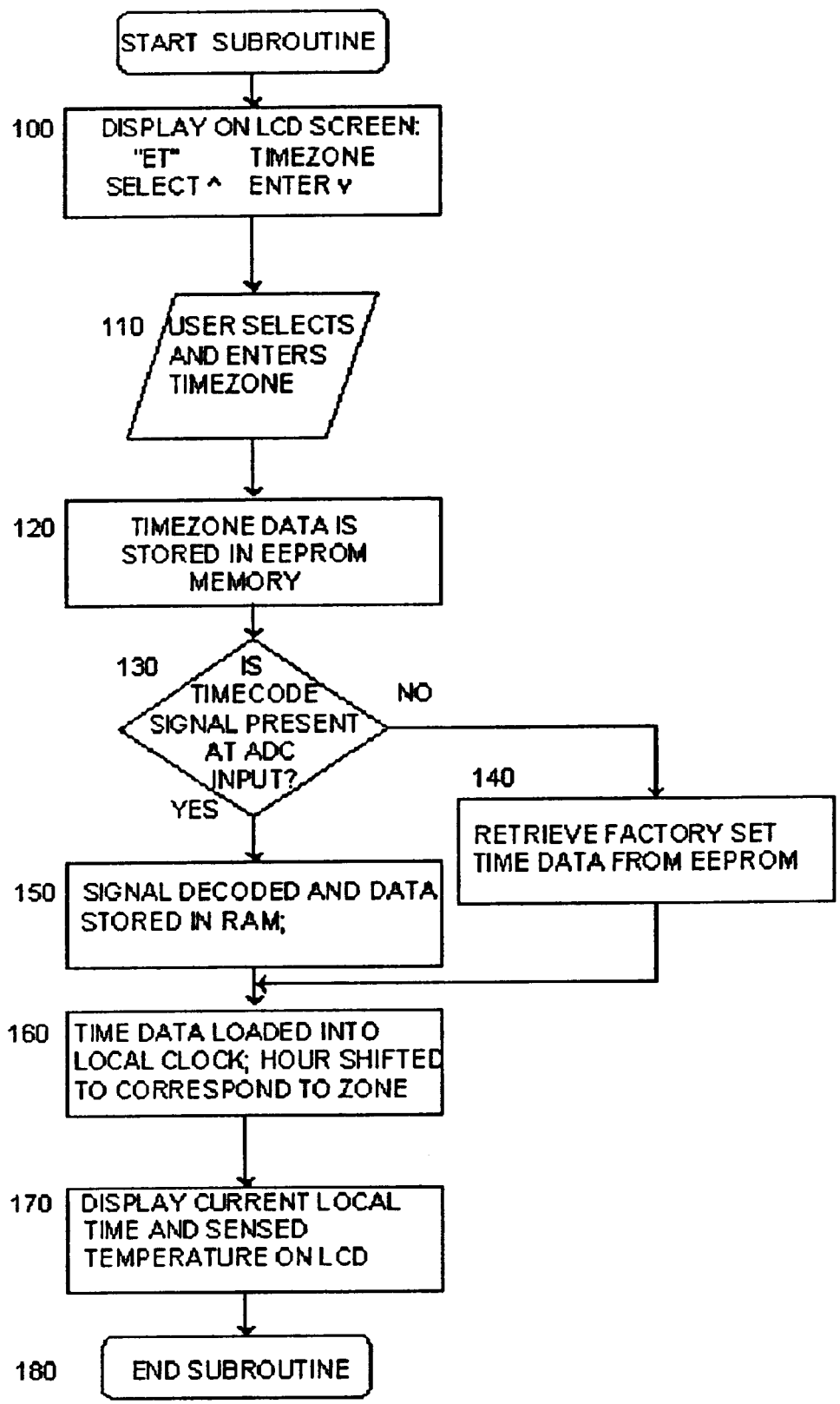
FIG. 2 is a flow chart representing a program subroutine for setting the time of the programmable thermostat in accordance with the present invention.

When the thermostat is initially connected to a power source, or is powered up after a loss of power, the software program in the microprocessor 20 initiates an automatic time set subroutine as described in FIG. 2. At step 100, the subroutine initiates the display of a "TIME ZONE" and a flashing "ET", followed by "SELECT ^" and "ENTER v " to prompt the user to press the temperature up button 12 to select, and the temperature down button to enter. The user can successively depress the up button to change from the "ET" eastern time default to "CT" for central time or to "MT" for mountain time or to "PT" for pacific time. After the user has pressed the temperature down button to enter a time zone at step 110, the subroutine stores the time zone into EEPROM memory in the microprocessor 20. The subroutine at step 130 checks the input port pin on microprocessor 20 for the presence of a signal from the receiver 24. If a signal is not received at step 130, the microprocessor retrieves the default settings for the time and date at step 140. If the microprocessor 20 decodes a WWVB broadcasted time code signal at step 150, the minutes, hours, day, and year information are stored into the microprocessor's RAM memory. It should be noted that WWVB's low frequency signal can cover the entire continental United States and much of Canada, and a small and relatively simple antenna and receiver can reliably decode the time code signal from any location in the continental United States. At step 160, the subroutine loads the time information from RAM memory into the local clock controlled by the microprocessor and adjusts the hour value to correspond to the time zone in EEPROM memory and daylight savings time. At step 170 the subroutine displays the current time and date on the LCD as determined by the local clock. The subroutine ends and the thermostat immediately begins operating at a default temperature set point of 73 degrees. The user is then free to adjust the temperature set point to any desired temperature setting. The user may at any time press the "Program" button to initiate a single temperature-setback program, which during setback periods will lower the last "desired" temperature set point selected by the user by a predetermined amount of ten degrees in heat mode, or raise the last "desired" temperature set point selected by the user by a predetermined amount of ten degrees in cool mode. The predetermined setback amount of ten degrees is based on data in an energy savings article "Automatic and Programmable Thermostats" published by the DOE Office of Energy Efficiency and Renewable Energy. The setback time period in the preferred embodiment has been predetermined to simplify user programming, and is based on the "go to bed" and "get up" times, of 11:00 PM and 5:00 AM for example, for a given percentage of U.S. Households as published by the National Sleep Foundation. Such typical household schedules may also be derived from other alternative sources. While the preferred embodiment has incorporated the above setback amount and setback time period, it should be noted that the invention should not be limited in scope to the above example of a predetermined setback amount and time period.

Figure 3:
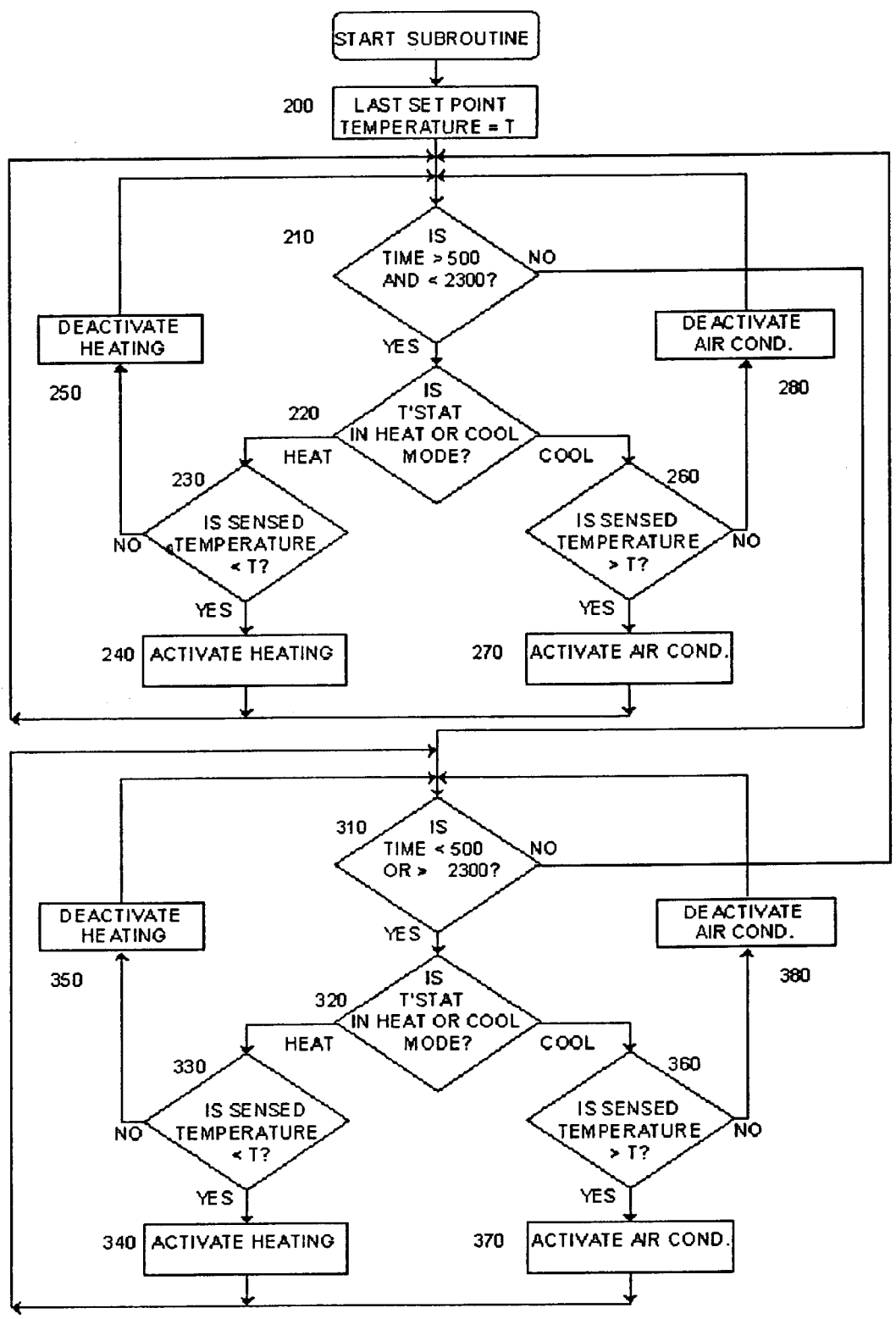
FIG. 3 is a flow chart representing a program subroutine for setting back the set point temperature of the programmable thermostat in accordance with the present invention.

Referring to FIG. 3, when the user presses the "Program" button, a subroutine program in the microprocessor stores the "desired" temperature set point last selected by the user as the programmed set point temperature T at step 200. At step 210, the subroutine checks whether the current time is greater than 5:00 AM and less than 11:00 PM before proceeding to step 220. At step 220, the subroutine determines if the thermostat is in heat mode or cool mode. When in heat mode, the subroutine at step 230 checks whether the sensed temperature is less than the programmed temperature set point T, in which case the subroutine activates heating at step 240. If the sensed temperature at step 230 is not less than the programmed temperature set point T, the heating is deactivated at step 250. When the thermostat is in the cool mode at step 220, the subroutine checks at step 260 whether the sensed temperature is greater than the programmed temperature set point T, in which case the subroutine activates air conditioning at step 270. If the sensed temperature at step 260 is not greater than the programmed temperature set point T, the air conditioning is deactivated at step 280. The subroutine will maintain the programmed set point temperature T in this manner until the time at step 210 is no longer between 5:00 AM and 11:00 PM. When this occurs, the subroutine proceeds to setback operation at step 310. At step 310, the subroutine checks whether the current time is less than 5:00 AM or greater than 11:00 PM before proceeding to step 320. At step 320, the subroutine determines if the thermostat is in heat mode or cool mode. When in heat mode, the subroutine checks at step 330 whether the sensed temperature is more than ten degrees less than the programmed temperature set point T, in which case the subroutine activates heating at step 340. If the sensed temperature at step 330 is not more than ten degrees less than the programmed temperature set point T, the heating is deactivated at step 350. When the thermostat is in the cool mode at step 320, the subroutine checks at step 360 whether the sensed temperature is more than ten degrees greater than the programmed temperature set point T, in which case the subroutine activates air conditioning at step 370. If the sensed temperature at step 360 is not more than ten degrees greater than the programmed temperature set point T, the air conditioning is deactivated at step 380. The subroutine maintains a ten-degree offset from the programmed set point temperature T in this manner until the time at step 310 is no longer between 11:00 PM and 5:00 AM. At such time, the subroutine returns to normal temperature set point operation at step 210. If at any point the user desires to temporarily adjust the temperature setting, the user may press the up or down temperature buttons to hold the adjusted temperature setting for a two-hour period before returning to the program subroutine at step 200. The user may turn off the program by simply pressing the program button once again, and the thermostat will immediately begin operating at the last temperature set point selected by the user. It should be noted that the user may also have the option to program the thermostat in the same manner used by prior art thermostats, by manually selecting specific time periods and temperatures.

Those skilled in the art will recognize that the inventive digital thermostat of this invention may be useful in many HVAC applications and in programming of such HVAC applications. Inasmuch as many modifications within the spirit of the invention will be apparent to those skilled in the art, the scope of the invention should be determined by reference to the claims appended below and the full scope of equivalents as provided by applicable laws.

What is claimed is:

1. An improved programmable digital thermostat having user input means for selecting a desired temperature setting, the improvement comprising:

time setting means for receiving a broadcast time signal and automatically storing the local time in the thermostat for the user; and activation means for running a single program that maintains the last selected temperature setting during predetermined non-setback time periods, and offsets the last selected temperature setting by a predetenmined amount during predetermined setback time periods, wherein the activation means is selected by a single action of the user.

2. The thermostat according to claim 1, wherein the activation means comprises a single button that runs the program when pressed only one time.

3. The thermostat according to claim 1, wherein the activation means comprises at least two buttons that run the program when simultaneously pressed only one time.

4. The thermostat according to claim 3, wherein the predetermined non-setback time period is substantially the time period the user is awake during the day.

5. The thermostat according to claim 4, wherein the predetermined setback time period is substantially the time period the user is asleep during the night.

6. The thermostat according to claim 5, wherein the predetermined amount for offsetting the last selected temperature setting is in the range of 5 to 15 degrees Fahrenheit.

7. An improved programmable digital thermostat having user input means for selecting a desired temperature setting and for selecting a setback program in the thermostat, the improvement comprising:

time setting means for receiving a broadcast time signal;

user input means for selecting the time zone of the user;

software means for automatically setting the local time in the thermostat for the user; and wherein the means for selecting a setback program comprises activation means for running a single program that maintains the last selected temperature setting during a predetermined non-setback time period, and offsets the last selected temperature setting by a predetermined amount during a predetermined setback time period, wherein the activation means is selected by a single action of the user.

8. An improved programmable digital thermostat having user input means for selecting a desired temperature setting and for selecting a program to control the thermostat, the improvement comprising:

a user input means for selecting a time zone setting for the thermostat;

a receiving means for receiving a broadcast signal, wherein the broadcast signal is a signal broadcast by station WWVB that comprises time, day and year information; and a control means for storing a value representing the local time corresponding to the broadcast signal and time zone, wherein the control means automatically sets the thermostat time independent of the user.

9. An improved programmable digital thermostat having user input means for selecting a desired temperature setting and for selecting a program to control the thermostat, the improvement comprising:

a user input means for selecting a time zone setting for the thermostat;

a receiving means for receiving a broadcast signal, wherein the broadcast signal is a signal broadcast by station WWVB that comprises time, day and year information;

a control means for storing a value representing the local time corresponding to the broadcast signal and time zone, wherein the control means automatically sets the thermostat time independent of the user; and wherein the thermostat prompts the user to select a time zone with the user input means when power is applied to the thermostat.

10. An improved programmable digital thermostat having user input means for selecting a desired temperature setting and for selecting a program to control the thermostat, the improvement comprising:

a user input means for selecting a time zone setting for the thermostat;

a receiving means for receiving a broadcast signal, wherein the broadcast signal is a signal broadcast by station WWVB that comprises time, day and year information;

control means comprising a microprocessor for storing a value representing the local time corresponding to the broadcast signal and time zone, wherein the control means automatically sets the thermostat time independent of the user; and wherein the user selected time zone information is stored in non-volatile memory within the microprocessor, such that the time zone information is retained in the event of a temporary loss of power.

11. The improved programmable thermostat according to claim 10, wherein the receiving means comprises an antenna tuned for about 60 kHz.

* * * * *